United States Patent [19]

Périou

[11] Patent Number: 4,799,734
[45] Date of Patent: Jan. 24, 1989

[54] LINEAR DEVICE FOR RAPIDLY ADJUSTING AND IMMOBILIZING A MOVABLE PART RELATIVE TO A FIXED PART

[75] Inventor: Pierre Périou, Cergy Pontoise, France

[73] Assignee: Rockwell-CIM, France

[21] Appl. No.: 107,605

[22] Filed: Oct. 13, 1987

[30] Foreign Application Priority Data

Oct. 13, 1986 [FR] France ............... 86 14178

[51] Int. Cl.⁴ .................. B60N 1/02; B60N 1/08; F16H 25/20
[52] U.S. Cl. ..................... 297/361; 74/89.15; 74/411.5; 74/424.8 R; 74/586; 83/446; 108/150; 188/67; 248/421; 248/429; 297/346
[58] Field of Search .......... 74/89.15, 411.5, 424.8 R, 74/586; 188/67, 166, 31, 60, 69, 196 D, 202; 297/348, 355, 361; 83/446; 248/421, 429; 108/150

[56] References Cited

U.S. PATENT DOCUMENTS

| | | | |
|---|---|---|---|
| 895,152 | 8/1908 | Bornefeld | 188/69 |
| 2,501,976 | 3/1950 | Vitek | 297/348 |
| 2,579,305 | 12/1951 | Cushman | 74/586 |
| 3,046,055 | 7/1962 | Martens | 188/196 D |
| 3,127,788 | 4/1964 | Martens | 74/586 |
| 3,246,868 | 4/1966 | Martens et al. | 297/361 |
| 3,350,135 | 10/1967 | Martens | 297/355 |
| 3,356,411 | 12/1967 | Homier et al. | 297/355 |
| 3,398,986 | 8/1968 | Homier | 297/355 |
| 3,436,973 | 8/1969 | Aweimrine | 74/89.15 |
| 3,479,890 | 11/1969 | Howell | 74/89.15 |
| 4,453,624 | 6/1984 | Graham | 192/67 R |
| 4,589,301 | 5/1986 | Griner | 74/586 |
| 4,630,866 | 12/1986 | McFarlane | 74/424.8 R |

FOREIGN PATENT DOCUMENTS

| | | | |
|---|---|---|---|
| 487679 | 4/1918 | France | 83/446 |
| 140499 | 5/1953 | Sweden | 188/196 D |

Primary Examiner—Allan D. Herrmann

[57] ABSTRACT

This device comprises at least one pair of screw-and-nut elements cooperative with the fixed and movable parts in respect of which elements the screw angle is large enough to ensure that the efficiency of the translation to the rotation is slightly positive, and is provided with means for locking the rotary element of the pair after adjustment of the position of the movable part. This system permits the locking of the movable part in the chosen position by a relatively small force as compared to the forces to which the device is subjected. The device is useful for adjusting a table guide of a woodworking machine, or for adjusting a car seat or the seat of a stool.

6 Claims, 10 Drawing Sheets

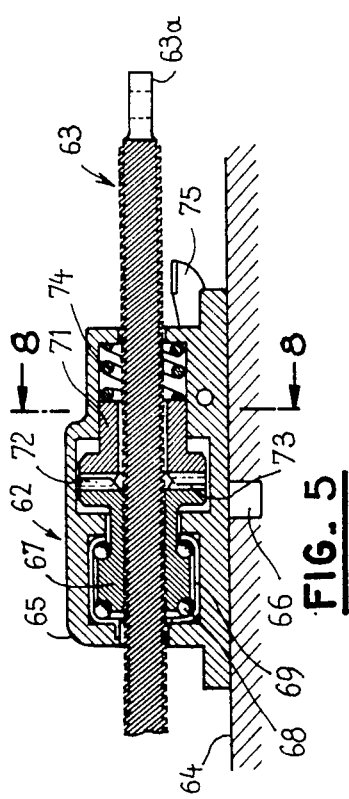
FIG. 5
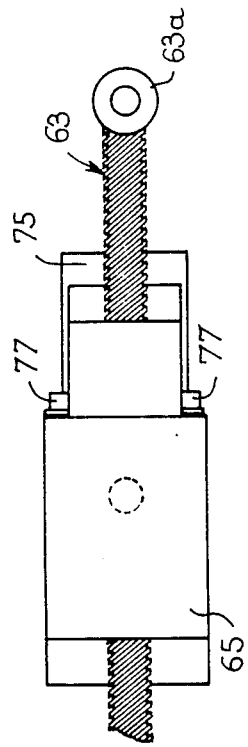
FIG. 6
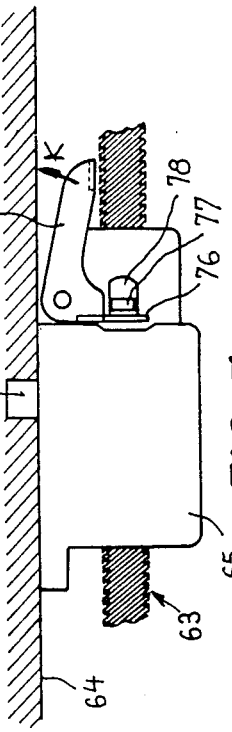
FIG. 7
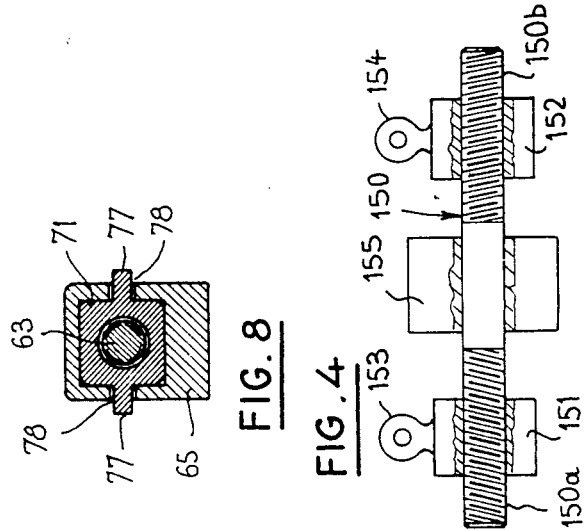
FIG. 8
FIG. 4
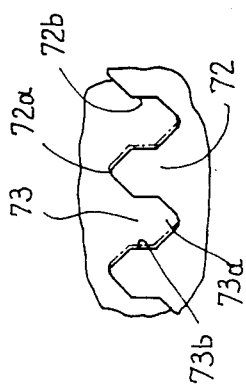
FIG. 9

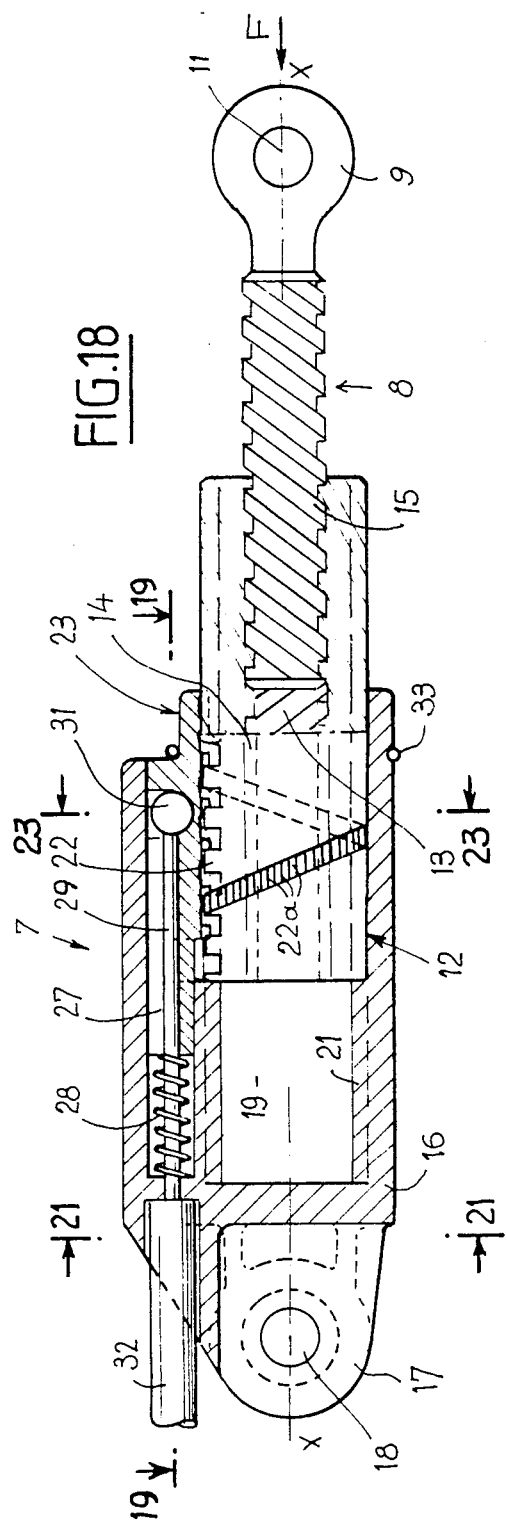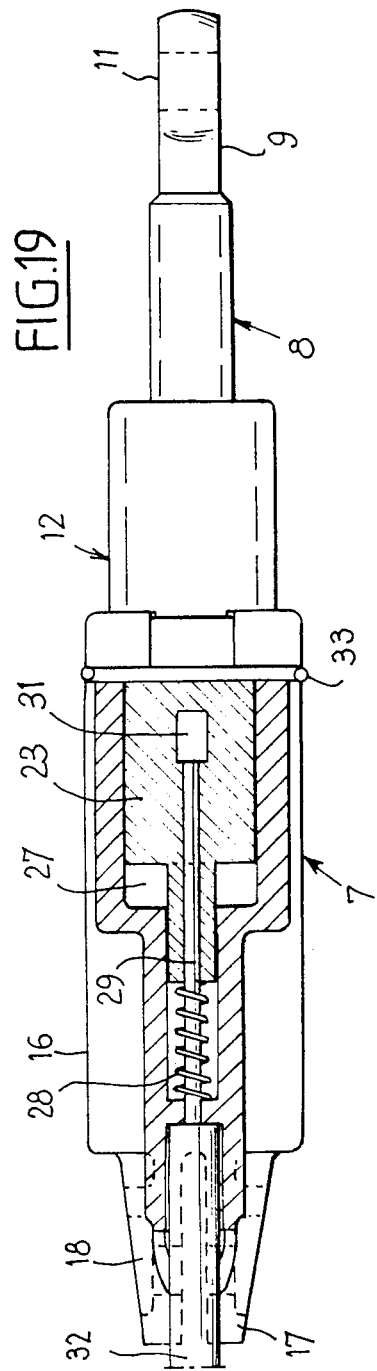

LINEAR DEVICE FOR RAPIDLY ADJUSTING AND IMMOBILIZING A MOVABLE PART RELATIVE TO A FIXED PART

The present invention relates to a linear device for the rapid adjustment and immobilization of a movable part relative to a fixed part.

Such a device, which constitutes a mechanical jack, is of use in very many applications, for example for adjusting the guide of a woodworking machine table, or for adjusting the positions of elements of a seat, in particular in a motor vehicle, boat or aircraft.

A seat adjusting system is known from French patent No. 2 567 562 employing the combination of a screw and a gear wheel provided with locking shoes actuated by a spring. However, such a device has in practive an insufficient resistance to forces and moreover the shoes have been found to be unsuitable, since they require an excessively strong spring. As concerns the resistance to forces that such an adjusting system must be capable of providing, it should be mentioned that it must be capable of resisting an impact on the front of the vehicle travelling at 60 k.p.h. corresponding to a deceleration of 20 G. Now, this known structure is incapable of resisting such an impact.

Another structure is also known which comprises a shaft extending through locking washers each of which is capable of being actuated by a spring which applies them against the shaft so as to lock the latter. Such a device is costly, since the washers must be made from noble metals which are harder than that of the shaft. Further, these washers are difficult to machine owing to the close tolerances which must be kept to between the diameters of the washers and the diameter of the shaft. On the other hand, if these tolerances are respected, this device has the advantage of resisting sudden decelarations reaching as much as about 20 G.

An object of the invention is therefore to provide a linear device which constitutes a mechanical jack for rapidly adjusting a movable part relative to a fixed part, is capable of resisting sudden shocks on the other of magnitude indicated hereinbefore, and is moreover relatively easy and cheap to manufacture.

According to the invention, this device comprises at least one pair of screw-and-nut elements cooperating with the fixed and movable parts whose threads have a sufficiently large helix angle to ensure that the efficiency of the translation to the rotation is slightly positive and is provided with means for locking the rotary element of the screw-and-nut pair after the adjustment of the position of the movable part.

As is known, in a screw-and-nut linear adjusting device, the efficiency of the device when the screw is subjected to an axial force is defined by the ratio of the power obtained at the output to the power furnished at the input, this efficiency is defined by the expression:

$$\eta = \frac{\tan(\beta - \xi)}{\tan \beta}$$

in which
$\eta$ = efficiency
$\beta$ = helix angle of the screw threads in the nut and screw
$\xi$ = angle of friction between the surfaces of the cooperating screw threads.

Thus, when the helix angle is less than the angle of friction, the efficiency is negative or zero. In other words, when the screw is subjected to an axial thrust, the nut does not rotate.

According to a first embodiment, the screw is movable in translation, fixed in rotation and integral with the movable part, and extends through a nut which is fixed in translation, guided in rotation in a housing integral with said fixed part and capable of being provided with means for locking the nut.

According to a second embodiment of the invention, the device comprises a screw movable in translation and fixed in rotation, a nut tapped with screwthreads having opposite hands, and a tapped block through which the nut extends, said block being capable of being rendered integral with the movable part to be adjusted while the screw is integral with the fixed part, the nut being movable in translation and in rotation when an axial force is exerted on the block by the movable part and the block being capable of carrying a system for locking the nut.

According to a third embodiment of the invention, the device comprises a nut in which are provided two tappings whose screw threads have opposite hands and each cooperate with a screw, said two screws having screw threads of opposite hands and the nut being rotatively mounted in a support housing through which the screws extend, so that, with one of the screws integral with the movable part, the nut is movable in rotation and in translation under the action of the axial force exerted on the screw integral with the movable part to be adjusted, and the housing is provided with nut locking means.

According to a fourth embodiment of the invention, the screw carries two screw threads having opposite hands each of which cooperates with a nut, one of the nuts being connected to the fixed part whereas the other nut is connected to the movable part to be adjusted, whereby the force exerted on the nut movable in translation from the movable part moves the screw both in translation and in rotation, the screw extending through a housing optionally provided with means for locking said screw.

An an example among the many possible applications of the linear adjusting device according to the invention, a vehicle seat structure may be equipped, for adjusting the inclination of its backrest relative to the seat, with two linear devices according to the invention articulated on one hand to the lower ends of the frame of the backrest and to the seat on the other hand. For the purpose of adjusting the seat in height, two adjusting devices are articulated, on one hand, to the seat, and, on the other hand, to movable slides integral with the seat and slidable in slideways fixed to the floor. For the purpose of longitudinally adjusting the seat, two devices according to the invention are articulated, on one hand to the two fixed slideways, and on the other hand to links connected to the seat.

Calculations and tests carried out have shown that, after a suitable choice of a screw thread angle (i.e. the angle of inclination of the threads relative to a perpendicular to the axis of the screw), an axial thrust force suddenly applied on the screw-and-nut pair results, in the locking elements, in a radial force which may be reduced to about 10% of the axial thrust received. Under these conditions, the radial forces effectively transmitted enable the mechanical jack according to the invention to resist a front impact or shock on the order of magnitude indicated hereinbefore.

Further features and advantages of the invention will be apparent from the following description with reference to the accompanying drawings, which illustrate by way of non-limiting examples several embodiments thereof:

FIGS. 1 to 4 are simplified semi-axial sectional and semi-elevational views of four embodiments of the linear adjusting device according to the invention;

FIG. 5 is an axial sectional view of a device of the type shown in FIG. 1, provided with a first embodiment of a locking system;

FIGS. 6 and 7 are respectively top and side elevational views of the device of FIG. 5;

FIG. 8 is a cross-sectional view taken on line 8—8 of FIG. 5;

FIG. 9 is a partial plan view to an enlarged scale of a detail of the locking system of the device of FIGS. 5 to 9;

FIG. 18 is an axial sectional view of an embodiment, of the type of that of FIG. 2, of the rapid adjusting device according to the invention provided with another locking system;

FIG. 19 is a longitudinal sectional view taken on line 19—19 of FIG. 18;

Figure 1:
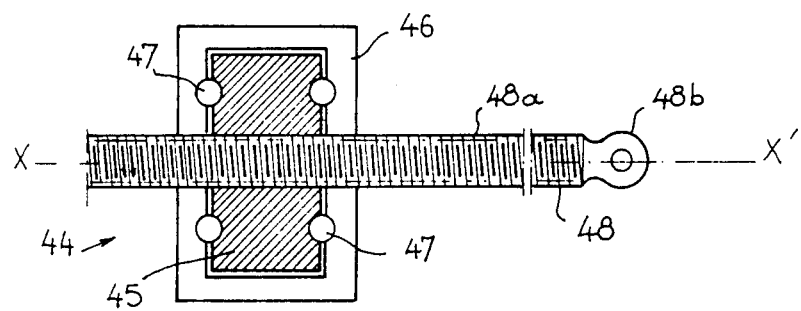

FIG. 1 shows a first embodiment of a linear device according to the invention for rapidly adjusting a movable part relative to a fixed part (not shown). This device comprises a screw 48 extending through a nut 45 disposed in an inner cavity of a housing 46 with interposition of ball bearings having balls 47.

The bore of the nut 45 is provided with a tapped screw thread engaged with the screw thread 48a of the screw 48 and the nut 45 is prevented from moving axially inside the housing 46. Consequently, it is solely movable in rotation about the axis X—X' of the screw 48 which is movable in translation and fixed in rotation. The screw has an end eye 48b whereby it can be rendered integral with the movable part to be adjusted, while the housing 46 is integral with the fixed part. The angle of the screw 48, i.e. the angle of inclination of its threads relative to the perpendicular to the axis X—X' (also termed helix angle) is so chosen as to be large enough to ensure that the efficiency of the translation of the screw 48 to the rotation of the nut 45 is slightly positive. The device may be provided with a locking system (not shown) whereby it is possible lock the nut 45 against rotation, and consequently the screw 48 against translation, when the latter is in the position corresponding to the desired adjustment of the movable part. An axial thrust on the screw 48 in either direction results, in this device, solely in a rotation of the nut 45 in the housing 46.

Figure 2:
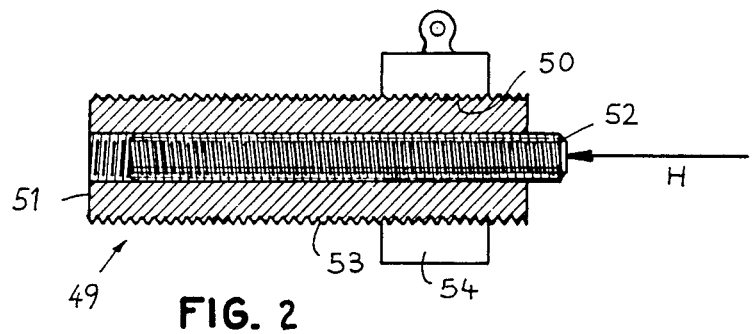

In the second embodiment of the device illustrated in FIG. 2, the device 49 comprises a screw 52 which is movable in translation and fixed in rotation, a nut 51 having a tapped bore cooperating with the screw thread of the screw and an outer screw thread 53 whose hand is the opposite of that of the tapped bore through which the screw 52 extends. The nut 51 extends through a block 54 provided with a tapped bore 50 and capable of being rendered integral with the fixed part (not shown) to be adjusted, while the screw 52 is integral with the movable part. Thus, the nut 51 is movable both in translation and in rotation when an axial force H is exerted on the screw 52 by the movable part. The block 54 is capable of carrying a locking system (not shown) for locking the nut 51. As in the preceding embodiment, the helix angle of the threads of the screw 52 is so chosen as to be large enough to ensure that the efficiency of the translation to the rotation is slightly positive.

Figure 3:
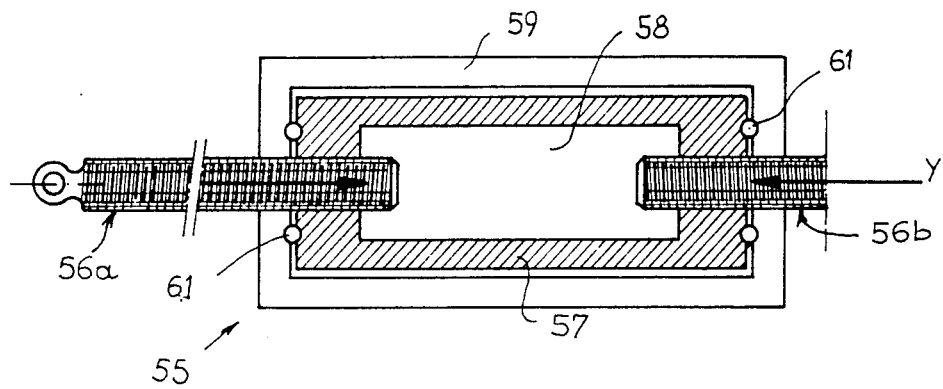

FIG. 3 illustrates a further embodiment of the adjusting device in which the latter comprises a nut 57 having an inner cavity 58 and in the end portions of which are arranged two tapped bores whose threads have opposite hands and each cooperate with a screw 56a, 56b, these two screws having opposite hands. The nut 57 is rotatively mounted in a support housing 59 through which the screws 56a, 56b also extend. The helix angle of the threads of the latter is so chosen to ensure that the efficiency of the translation to the rotation is slightly positive, and as one of the screws 56a, 56b is integral with the movable part (not shown) to be adjusted, and the other screw is integral with the fixed part, the nut 57 is movable in both rotation and translation under the action of an axial force such a Y exerted on the screw integral with the movable part. It will be understood that the housing 59 accompanies the movement in translation of the nut 57. The housing 59 may be provided with locking means (not shown) for locking the nut 57 and consequently locking the screw connected to the movable part.

In the fourth embodiment shown in FIG. 4, the adjusting device comprises a screw 150 carrying two screw threads 150a, 150b having opposite hands and each cooperative with a nut 151, 152, one of these nuts being connected to the fixed part whereas the other nut is connected to the movable part to be adjusted by eyes 153, 154, respectively. The screw 150 extends through the housing 155 which may be provided with means for locking the screw 150. A force exerted in the direction parallel to the axis of the screw 150 on the nut (153 or 154) which is movable in translation by the movable part moves the screw 150 in both translation and rotation.

In the embodiment illustrated in FIGS. 5 to 9, the adjusting device or mechanical jack 62 is of the type of that shown in FIG. 1 and comprises a screw 63 whose end portion 63a is adapted to be articulated to a part to be adjusted which is movable relative to the fixed support 64 of the device 62. The screw 63 extends throughout the housing 65 articulated by a pivot 66 to the support 64. The pivot 66 is perpendicular to the axis of the screw 63 so as to permit the pivoting of the assembly of the device 62 about the pivot 66 for the purpose of accompanying the displacements of the part to be adjusted.

The screw 63 also extends axially through a nut 67 disposed in the housing 65 and fixed in translation and guided in rotation by ball bearings the balls 68 of which are retained by a sleeve 69. The nut 67 is prevented from rotating when the device is at rest by a locking element 71 through which the screw 63 axially extends and which carries radial teeth or dogs 72 which are engageable with corresponding dogs 73 of the nut 67, under the thrust of a spring 74 which is disposed in the housing 65 coaxially with the screw 63 and bears against the end wall of this housing. The nut 67 may be unlocked by a lever 75 which is mounted on the housing 65 to pivot about a pin extending transversely of the housing and which is provided with lateral ears 76 adapted to drive in axial translation two pins 77 integral with the locking element 71 and projecting laterally through the wall of the housing 65 in corresponding slots 78.

Thus, when the lever 75 is pivoted in the direction of arrow K (FIG. 7), the ears 76 cause the pin 77 and the locking element 71 surrounding the screw 63 to slide in the direction which shifts the locking element 71 away from the nut 67 so that the dogs 72 are disengaged from the dogs 73 and allow the nut 67 to rotate freely.

It will be observed (FIG. 9) that the teeth or dogs 72, 73 have pointed ends 72a, 73a which are complementary and laterally extended by flat surfaces 72b, 73b which prevent any natural disengagement of the dogs.

The unlocking of the nut 67 by shifting the lever 75 is effected against the return force exerted by the spring 74 which automatically puts the locking element 71 back into engagement with the nut 67 and locks it against rotation as soon as the lever 75 is released.

Figure 10:
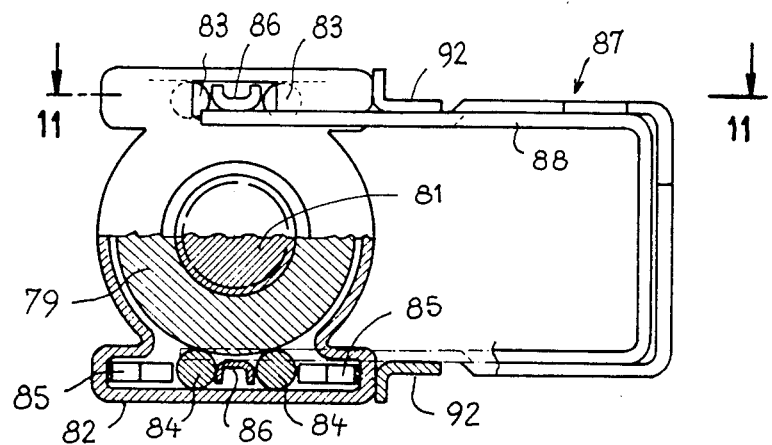
FIG. 10 is a partial elevational view and a partial sectional view taken on line 10—10 of FIG. 11 of a rapid adjusting device of the type of that of FIG. 1 provided with a second embodiment of the locking system.
Figure 11:
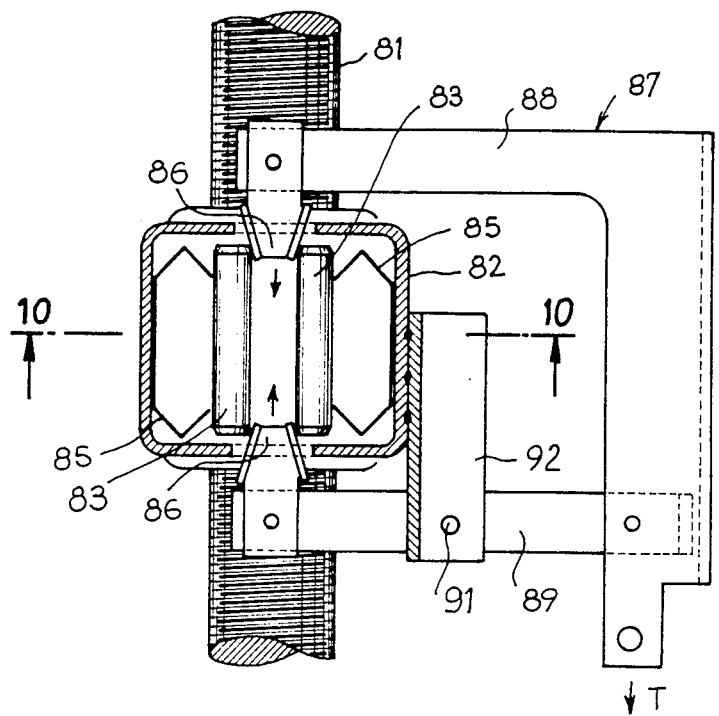
FIG. 11 is a partial plan view and a partial sectional view taken on line 11—11 of FIG. 10.

The embodiment shown in FIGS. 10 and 11 concerns an adjusting device of the type of that shown in FIG. 1 provided with means for unlocking the nut 72 as concerns rotation, the screw 81 extending through this nut. These means comprise, arranged in a diametrically opposed manner on each side of the nut 79 between the latter and the longitudinal walls of a housing 82, two pairs of parallel rollers 83, 84 which are elastically biased against the nut 79 by spring strips 85 which bear against the wall of the housing 82 in such manner as to prevent the nut 79 from rotating.

The device further comprises wedges 86 engaged between opposed ends of the rollers 83, 84, and means for advancing the wedges 86 between the rollers so as to move them apart and thus unlock or release the nut 79 or for retracting these wedges 86 for the purpose of locking the nut 79. In the embodiment illustrated in FIGS. 10 and 11, these means comprise a tongs 87 formed by two jaws 88, 89, the jaw 88 having an L shape and the jaw 89 being articulated to an end of the jaw 88. Each end of the jaws 88, 89 carries a wedge 86 and the jaw 89 is moreover articulated at 91 to an element 92 fixed to the outside of the housing 82, for example by welding.

When this locking system is at rest, as shown in FIG. 11, the springs 85 apply the rollers 83, 84 against the nut 79 and prevent it from rotating. If there is now exerted on the jaw 88 a force T parallel to the axis of the screw 81, the whole of the jaw 88 will move in the direction of the force T parallel to the screw 81 so that the wedge 86 of the jaw 88 will be forced between the rollers 83. At the same time, the jaw 89 pivots about its fixed articulation 91 so that the associated wedge 86 also enters between the rollers 83, 84. The latter are moved away from the nut 79 in opposition to the return force exerted by the springs 85 and the nut 79 is free to rotate.

Figure 12:
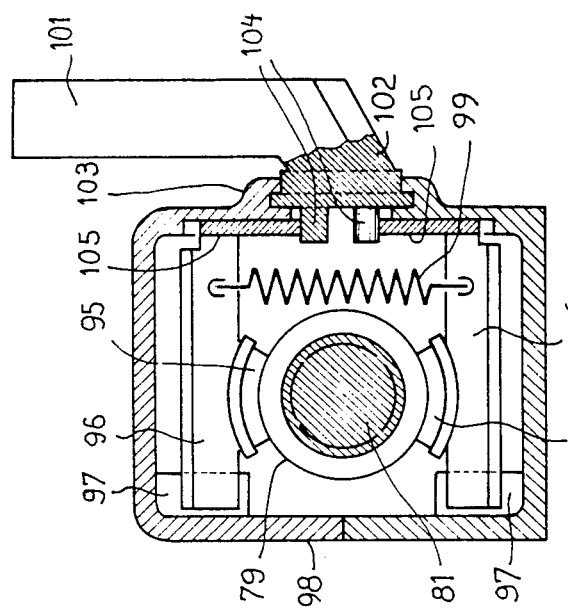
FIG. 12 is a sectional view taken on line 12—12 of FIG. 14 of an adjusting device of the type of that of FIG. 1 provided with another locking system.
Figure 14:
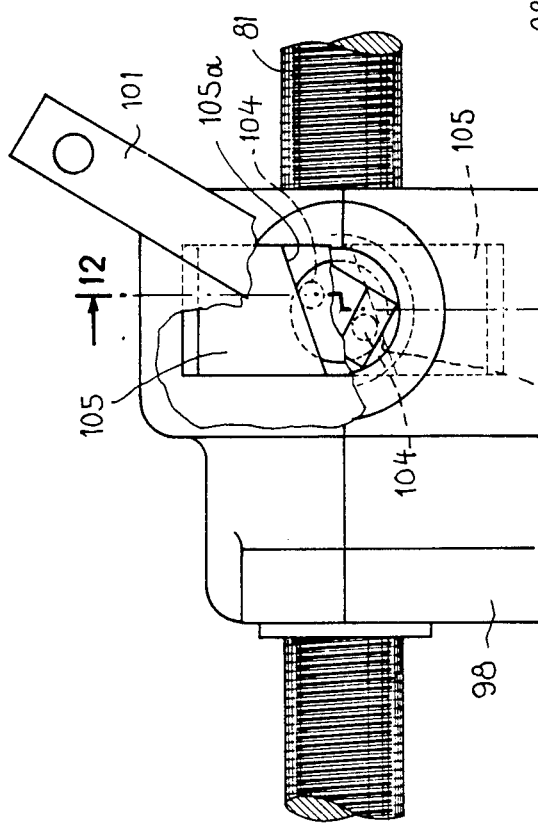
FIG. 14 is a longitudinal elevational view, with a part cut away, of the device of FIGS. 12 and 13, and its locking system.
Figure 13:
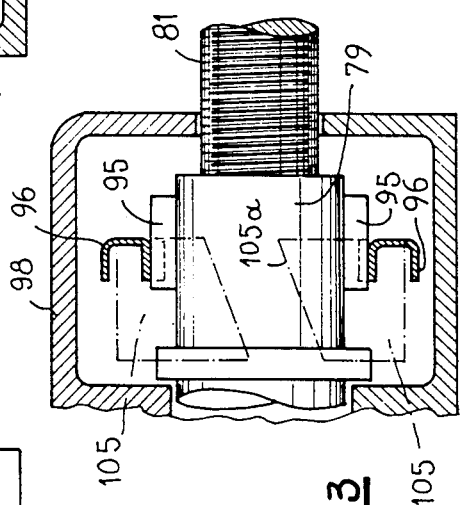
FIG. 13 is a semi-axial sectional view, semi-elevational view with a part cut away of the device of FIG. 12.

The device controlling the unlocking of the nut 79 of the mechanical jack, also of the type shown in FIG. 1, represented in FIGS. 12 to 14, comprises a pair of jaws 95 respectively integral with a section member 86 and capable of being moved away from the nut 79 by sliding on guides 97 inside the housing 98. The jaws 95 have a curvature equal to that of the cylindrical nut 79 so as to be capable of being applied against the latter under the action of a spring 99, and are capable of being moved away from the nut 79 by the rotation of a lever 101 whose cranked end portion 102 is rotatively engaged in a projection 103 of the wall of the housing 98. The end portion 102 carries two pins 104 each of which is in contact with a plate 105 integral with one end of the corresponding section member 96. Each plate 105 has an edge 105a which is inclined relative to the axis of the screw 81 and in contact with the corresponding pin 104. At rest, the spring 99 maintains the jaws 95 applied against the surface of the nut 79 which is thus locked against rotation. When the lever 101 is lowered, the pins 104 exert on the respective plates 105 forces in opposite directions which move the jaws 95 away from each other so that the nut 79 is unlocked and is free to rotate.

Figure 15:
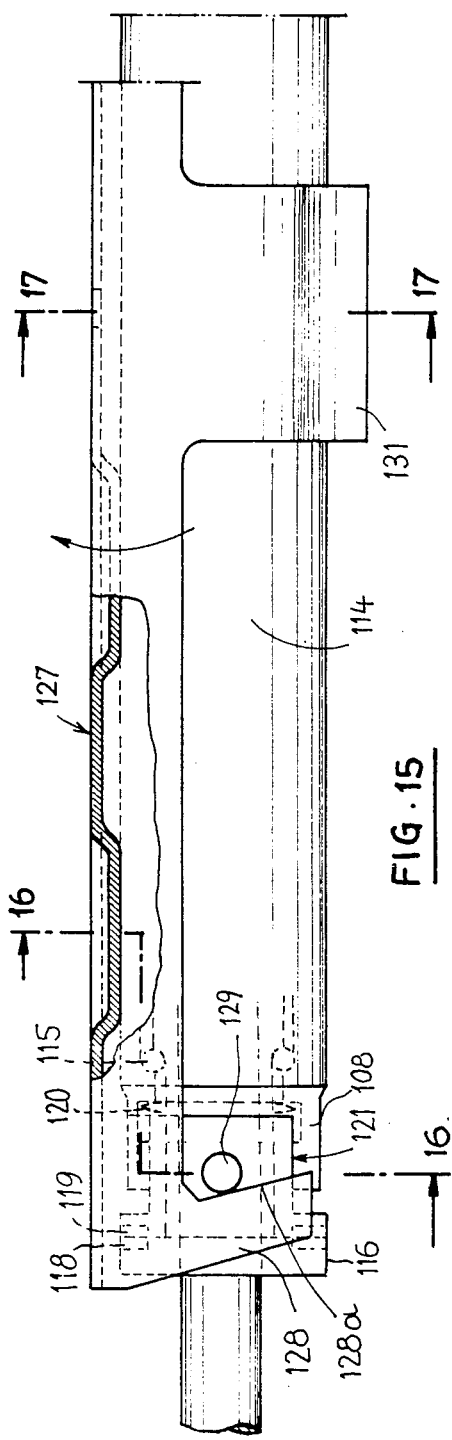
FIG. 15 is a longitudinal elevational view, and partial sectional view, of another locking system, of the adjusting device according to the invention.
Figure 17:
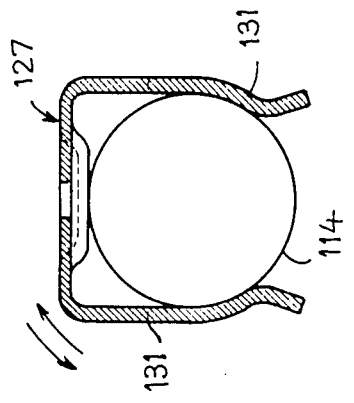
FIG. 17 is a cross-sectional view taken on line 17—17, of FIG. 15.
Figure 16:
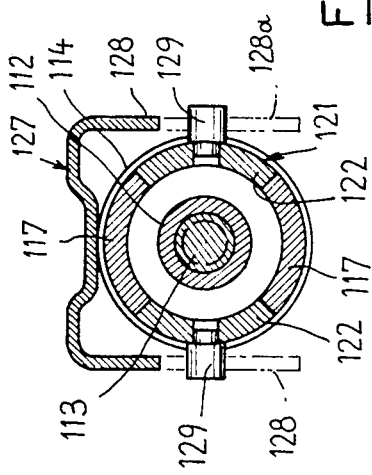
FIG. 16 is a cross-sectional view taken on line 16—16 of FIG. 18.
Figure 20:
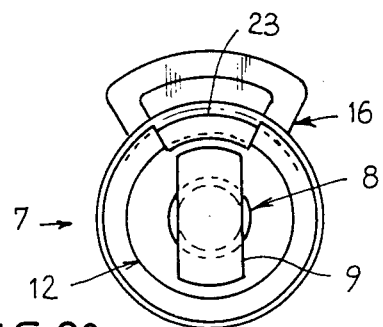
FIG. 20 is an end elevational view of the device according to the invention in the direction of arrow F of FIG. 18.
Figure 21:
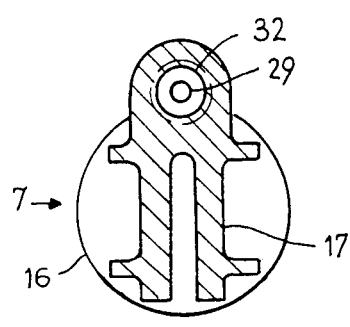
FIG. 21 is a cross-sectional view taken on line 21—21 of FIG. 18.
Figure 22:
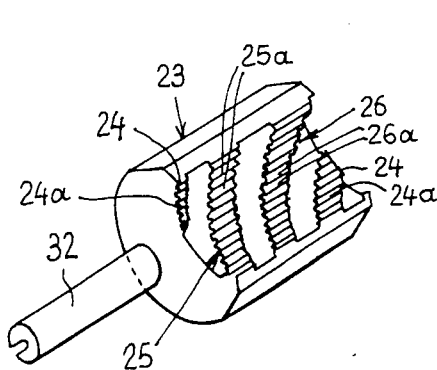
FIG. 22 is a perspective view of a portion of a locking cylinder permitting the locking of the block against rotation of the adjusting device of FIGS. 18 to 21.
Figure 23:
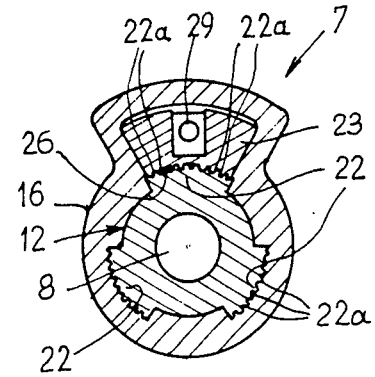
FIG. 23 is a cross-sectional view taken on line 23—23 of FIG. 18.

FIGS. 15 to 17 represent another embodiment of the adjusting device according to the invention, only one half of the latter being seen in FIG. 15, and the second half being symmetrical to the first part relative to a median transverse plane. This device is of the type of that shown in FIG. 3 and comprises a nut 112 through which a screw 113 extends and which is disposed in a housing 114, this nut being rotatively guided by ball bearings 115. The end 116 of the nut 112 axially projects outside the housing 114 and includes two identical cylindrical sectors 117 which extend axially between the end of the housing 114 and the end portion 116. On its side facing the housing 114 this end portion 116 is provided with a set of teeth 118 in which is capable of engaging a complementary set of teeth 119 of a dog 121 formed by two sectors 122 which are complementary to the sectors 117 between which they are slidable.

The dog 121 is subjected to the action of an elastically yieldable element 120 which bears against the end of the housing 114 and biases the dog 121 axially so that its teeth engage with the teeth 118 so that the latter are normally locked against rotation.

The device for controlling the unlocking of the nut 112 comprises, for each of the two screws 113, a member 127 constituted for example by a press-formed sheet of metal which partly surrounds the housing 114. Each member 127 comprises at its end located in facing relation to the dog 121, two lateral wings 128 each having an edge 128a which is inclined relative to a plane perpendicular to the axis of the screw 113 and in contact with a lateral pin 129 which extends laterally from the dog 121. At its end opposed to the wings 128, the sheet of metal 127 is provided with two lateral extensions 131 applied against the housing 114 and permitting the manual grasping of the sheet of metal 127 for pivoting it about the housing 114.

Figure 28:
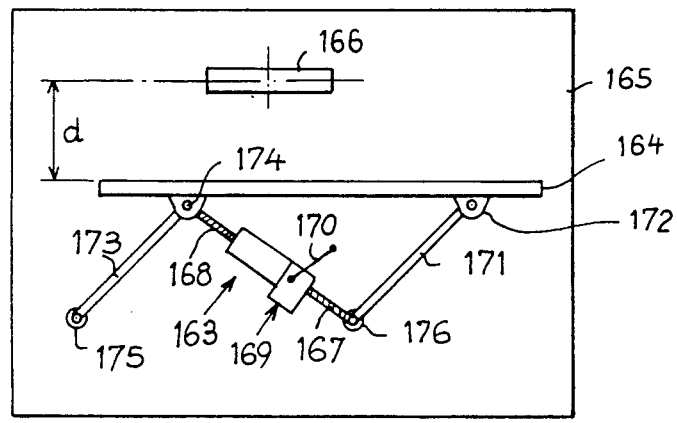
FIG. 28 is a top plan view of a woodworking machine table provided for the adjustment of its guide, with a device according to the invention.
Figure 29:
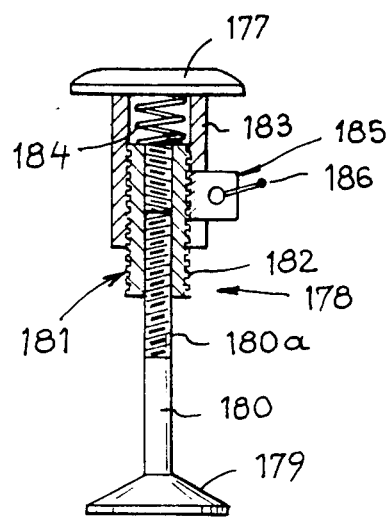
FIG. 29 is a vertical axial sectional view of a stool which is adjustable in height by means of an adjusting device according to the invention.

The elastically yieldable element 120 tending to maintain the dog 121 in engagement with the teeth 119, a rotation of the sheet of metal 127 in the direction of the arrow shown in FIG. 28, by means of the extensions 131, pivots the wings 128 so that their edges 128a exert on the pins 129 a force which causes the axial retraction of the dog 121 in opposition to the force exerted by the return spring 120, which unlocks the nut 112. On the other hand, when the control element 127 is released, the pressure exerted by the spring 120 on the dog 121 causes, through the pins 129, the return of the sheet of metal 127 to its initial position and the locking of the nut 112.

Description of the embodiment of FIGS. 18 to 23

The mechanical jack 7 comprises a screw 8 having one end portion 9 provided with an aperture 11 for the purpose of being articulated to the movable part to be adjusted, or to the fixed part, and a nut 12 provided with an axial bore 13 having tapped teeth 14 adapted to cooperate with the screw thread 15 of the screw 8. The nut 12 is disposed in a housing or body 16 which is rendered integral with one of the fixed and movable parts by an end ear 17 provided with an aperture 18.

Provided in the housing 16 is an axial cavity 19 receiving the nut 12, and the wall of the cavity 19 has a screw thread 21 adapted to cooperate with the complementary screw thread 22 of the nut 12 formed on the outside of the latter so as to permit the nut 12 to rotate inside the housing 16 about the general axis X—X of the mechanical jack 7 under conditions which will be described hereinafter. In the described embodiment, the screw thread 22 is a triple or three-start thread.

Further, the device 7 is provided with means for locking and unlocking the nut 12 so as to prevent the latter from rotating and the screw 8 from moving in translation or, on the contrary, to release the nut 12 and allow it to rotate and thus permit the axial movement in translation of the screw 8 inside the nut 12. Indeed, as the screw 8 is articulated by its end 9 to a movable or fixed part, it cannot rotate about its axis X—X so that, when this screw 8 is subjected to an axial thrust F, it can only move in axial translation in the nut 12 if the latter is free to rotate.

In the described embodiment, these means for locking the nut 12 comprise: a locking portion of a cylinder 23 provided with inner screw threads 24, 25, 26 conjugate with the screw thread 22 of the nut 12 (which is also a triple thread in this embodiment) and, in these two series of screw threads 22–26, there are provided respective splines 22a, 24a, 25a, 26a which are complementary and parallel to the axis X—X. The locking cylinder 23 is disposed in a longitudinal compartment 27 in the housing 16 and extending in a direction parallel to the cavity 19. Furthermore, the inner screw thread 21 is interrupted in an angular sector equal to that occupied by the locking portion of the cylinder 23, as can be seen FIG. 23. Consequently, if the locking cylinder 23 is in such axial position that its screw threads 24–26 are in the radial extension of the threads of the screw threading 21, the threads 24–26 form with the latter a single screw threading. This therefore allows the rotation of the nut 12 and its axial displacement in the housing 16 by cooperation of its screw threads 22 with the screw threading 21 which is put in phase with the threads 24–26.

The locking member 23 is biased by an elastically yieldable element 28, constituted by a coil spring coaxial with a cable 29 having one end rendered integral with the locking member 23 by a stop 31 disposed in a corresponding recess in the locking member 23. The cable 29 extends consequently in the compartment 27 and traverses the body 16 on the outside of which it is enclosed in a sheath 32. The cable 29 is provided at the end thereof opposed to the stop 31 with a control element (not shown), for example a manual handle. The spring 28 bears against an end wall of the compartment 27 and exerts on one end of the locking member 23 a thrust which is substantially parallel to the axis X—X and tends to maintain the locking member 23 in axial abutment against a retaining means such as a ring 33 partly engaged in a corresponding groove on the periphery of the housing 16.

The cavity 27 is so dimensioned as to allow reciprocating axial displacements of the locking member 23 and to guide these displacements by means of its walls (FIG. 19).

The adjusting device 7 operates in the following manner:

As the screw 8 is articulated by its end 9 to a movable part to be adjusted and the housing 16 is articulated by its end 17 to a part which is fixed relative to the movable part (or inversely), and the jack 7 is at rest, the thrust exerted by the spring 28 on the locking member 23 maintains the latter in abutment against the ring 33 in an axial position in which its screw threads 24–26 are offset relative to the screw threading 21 by 1/6 of the total pitch of the screw threads of this screw threading. Consequently, the screw threads 24–26 are engaged with the threads 22 by the fitting together of their complementary splines 22a and 24a–26a respectively. Thus, the nut 12 is locked in rotation in the housing 16 and an axial thrust F exerted on the screw 8 does not permit the latter to undergo an axial translation in the nut 12 and the screw 8 therefore remains immobilized.

If it is now desired to adjust the position of the movable part to which the screw 8 (or the body 16) is articulated, a pull is exerted on the cable 29 in opposition to the return force exerted by the spring 28. This pull is transmitted by the stop 31 to the locking member 23 which moves rearwardly in its compartment 27 so that the threads 24–26 and their splines 24a–26a are disengaged from the threads 22. At the end of this axial rearward movement of the locking member 23, the threads 24-26 come to be placed in the radial extension of the threads of the triple-thread 21 which they complete so as to form a single thread which enables the nut 12 to rotate freely in the housing 16. Thus, after the unlocking of the nut 12, an axial thrust F exerted on the screw 8 results in a double movement: the screw 8 causes the rotation of the nut 12 into which it travels by the cooperation of the threads 14 and 15, and the nut 12 effects an axial translation in the housing 16 into which it travels.

It will be understood that if an axial thrust opposed to the thrust F is exerted on the screw 8, this results in relative movements which are the opposite of the preceding movements of the elements 8 and 12. When the movable part has reached the desired position, the control cable 29 is released so that the spring 28 returns the locking member 23 to its initial position. Its thread 24-26 thus again engage with the threads 22 by the fitting together of the splines 22a and 24a-26a, which again locks the nut 12 against rotation and the screw 8 against translation.

The axial displacements of the locking member 23 are guided by the longitudinal walls of the cavity 27 (FIG. 3) and likewise the displacements of the cable 29 are guided by a corresponding cavity on the surface of the locking member 23.

Figure 24:
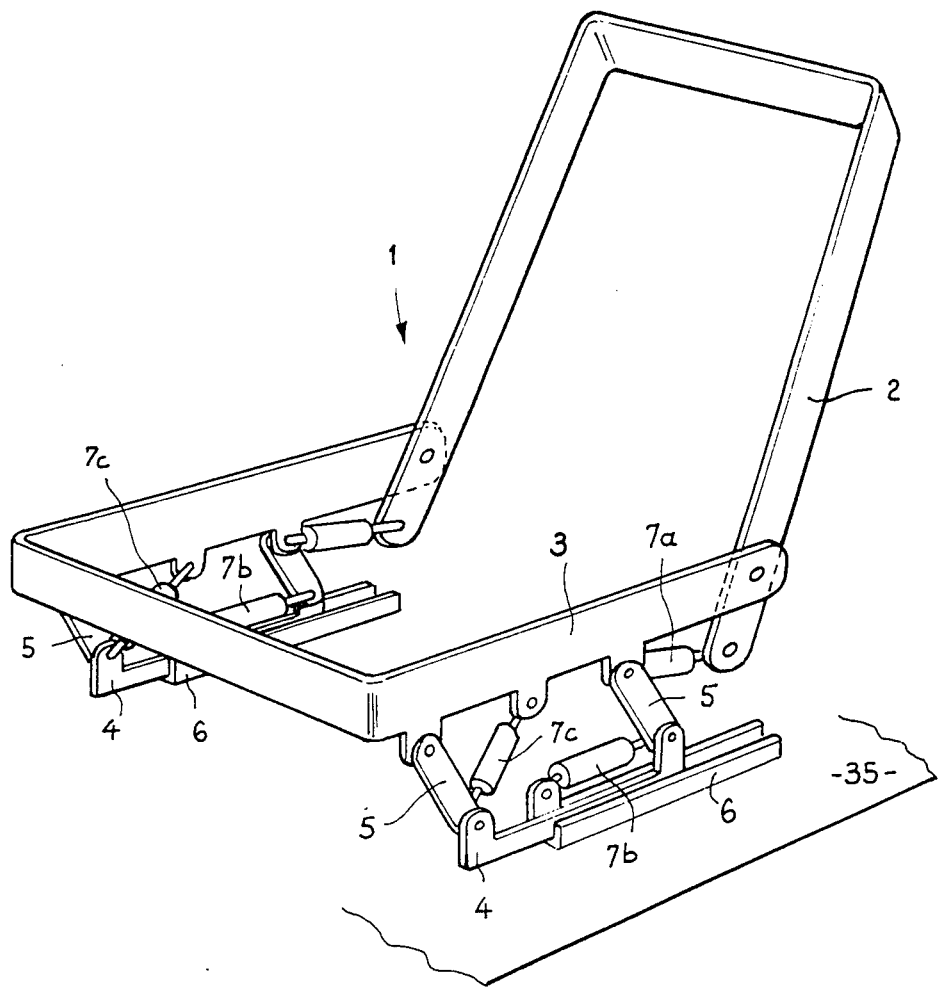
FIG. 24 is simplified perspective view of the frame of a vehicle seat structure provided with several linear adjusting devices according to the invention.

Applications of the rapid linear adjusting device or mechanical jack according to the invention FIG. 24 illustrates an example of the application of the rapid adjusting device according to the invention in the adjustment of component elements of a seat structure, which may be that of a vehicle (automobile, aircraft, boat) or of any fixed installation.

This seat structure comprises a framework 1 formed by a frame 2 of the backrest, a seat frame 3 to which the frame 2 is articulated, two lateral slides 4 each connected to the seat 3 by two links 5 articulated to the seat 3 and to the slides 4, the latter being slidably mounted in slideways 6 fixed to the floor 35.

The framework 1 is provided with several linear adjusting devices constituting as many mechanical jacks permitting the adjustment of the three component elements of the seat structure: two jacks 7a are articulated on one hand to the lower ends of the frame 2 and to the seat 3 for the adjustment of the inclination of the frame 2 and therefore of the backrest, two jacks 7b are articulated on one hand to the fixed slideways 6 and, on the other hand, to the movable slides 4, to permit the adjustment of the longitudinal position of the seat 3 on the floor, and two jacks 7c are articulated, on one hand, to the movable slides 4 and on the other hand to the seat 3, for the adjustment in height of the latter.

The housings of the jacks 7a are articulated to the seat 3 for pivotal movement about an axis perpendicular to the screw so as to be capable of pivoting about this axis and following the angular movements of the backrest 2 to which the screw is articulated. Inversely, the latter may be articulated to the seat 3 and the housing may be articulated to the backrest 2.

The housings of the jacks 7c are adapted to be articulated to the slides 4 integral with the seat 3 and slidable in the fixed slideways 6, while the screws are articulated to the seat 3 to permit the adjustment of the height of the seat 3 relative to the floor 35. It will be understood that this arrangement may be reversed, the screws being articulated to the slides 4 and the housings articulated to the seat 3.

The jacks 7b may be rendered integral with the fixed slideways 6 and the screws rendered integral with the seat 3 to permit the longitudinal adjustment of the latter. Inversely, the screws may be rendered integral with the fixed slideways 6 and the housings integral with the seat 3.

Figure 27:
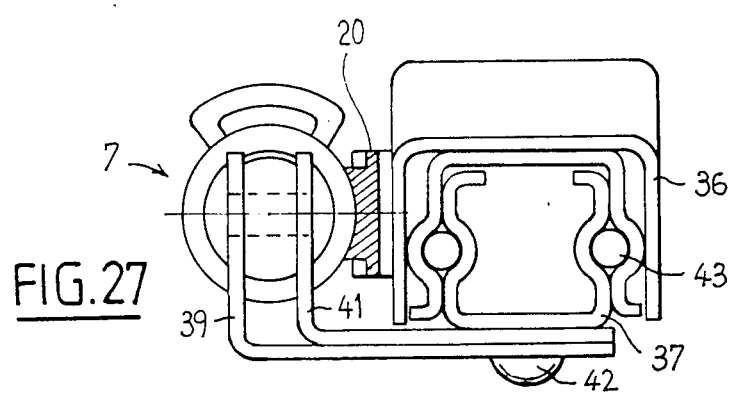
FIG. 27 is an end elevational view, with a part cut away, of the device of FIGS. 25 and 26.
Figure 25:
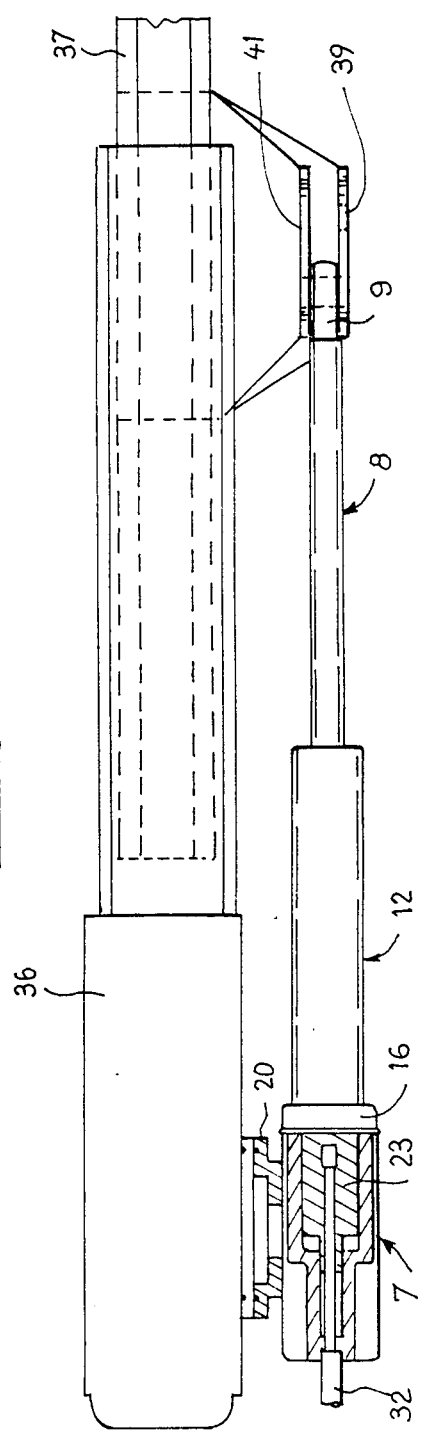
FIGS. 25 and 26 are respectively a top plan view and a longitudinal elevational view illustrating the placement of the adjusting device of FIGS. 18 to 24 in a vehicle seat structure for the longitudinal adjustment of the seat of said seat structure.
Figure 26:
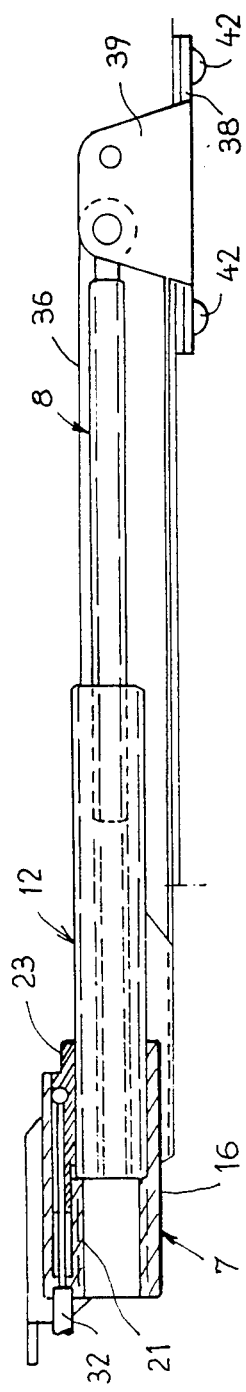

FIGS. 25-27 illustrate the placement of an adjusting device 7 which is consequently in accordance with the embodiment shown in FIGS. 18-23, by an attachment 20 on a slide 36 slidable on a slideway 37 fixed to a floor, for example of a vehicle, for adjusting the longitudinal position of the seat (not shown) of the seat structure, the jacks 7 being positioned in front of the seat structure. The screw 8 is shown in its position in which it is extended to the maximum extent out of the nut 12, which is in its position in which it is extended to the maximum extent out of the housing 16. The end 9 of this screw is articulated to two L-section members 39, 41 fixed to the fixed slideway 37, for example by rivets 42. Rolling balls 43 are conventionally interposed between the slide 36 and slideway 37.

FIG. 28 illustrates the application of a device 163 according to the invention in the adjustment of the guide 164 of the table 165 of a woodworking machine provided for example with a circular saw 166, or a shaper or planer, etc. Up to the present time, the adjustment of the guide 164 has been effected by a slot system and clamping by means of a nut which is advantageously replaced by the device 163. The latter is of the type shown in FIG. 3 and therefore has two screws 167, 168 and a locking system 169 with a manual actuating lever 170. The screw 167 is articulated to a link 171 which is articulated at its opposite end to an ear 172 on the guide 164. The screw 168 and a second link 173 are articulated to a second ear 174 on the guide 164, the opposite end of the link 173 being mounted to be pivotable about a fixed pivot 175, the pivot 176 of the articulation of the screw 167 and of the link 171 being also fixed to the table 165.

The articulation points 172, 174, 175 and 176 constitute the corners of a parallelogram structure, the points 175 and 176 of which are fixed while the other two are movable when the system 169 is unlocked. Indeed, it is then possible to pivot the links 171, 173 for shifting the guide 164 while maintaining it parallel to itself and thus vary the dimension d between the guide and the circular saw 166, the diagonal of the parallelogram structure varying in the course of this displacement.

The locking system 169 is arranged to be capable of preventing the rotation of the nut associated with the rods 167, 168, this nut being then suitably provided with an outer screw thread capable of engaging in the screw thread of the locking system 169.

FIG. 30 shows the application of the invention to the adjustment in height of the seat 177 of a stool 178 the foot of which is constituted by a disc 179 bearing against the ground and a screw 180. The latter is part of an adjusting device of the type shown in FIG. 2 which consequently comprises a nut 181 having a tapped bore which cooperates with the screw thread 180a of the screw 180 and a screw thread 182 cooperative with the tapped bore of a housing 183 which carries at its upper end the seat 177. A spring 184 is disposed in the housing 183 and bears against the nut 181 so as to exert on the seat 177 a vertical upward thrust. The device is completed by a locking system 185 adapted to lock the nut 181 against rotation.

To adjust the height of the seat 177, the housing 183 is unlocked relative to the nut 181 by shifting the lever 186 of the locking system 185. Consequently, the spring 184 urges the seat 177 and the housing 183 upwardly which drives the nut 181 in rotation in the rising direction since the efficiency of the system constituted by the screw threaded nut 181 and the tapped housing 183 is reversible. As the foot 179, 180 remains fixed in position, the seat 177 travels upwardly to the extent of the pitch or lead of said seat relative to the nut 181, plus the pitch or lead of the nut 181 relative to the screw 180. Therefore, if the two aforementioned pitches or leads are equal, the seat 177 travels at twice the speed of the nut 181. The seat 177 and the whole of the device are locked in the chosen position by actuating the locking system 185 which stops the rotation of the nut 181. The locking system 185 essentially comprises a shoe provided with an inner screw thread which is cooperative with the screw thread 182 and can be moved away from the latter by the manual lever 186.

In these various embodiments and applications, the invention permits the immobilization of the movable part in the chosen position by a relatively small force as compared to those to which the device is subjected.

What is claimed is:

1. A linear device for the rapid adjustment and immobilization of a movable part relative to a fixed part, said device comprising:
   at least one pair of elements consisting of a nut and a screw which are screw threadedly interengaged and cooperative with said fixed and movable parts;
   said nut and screw having screw threads which have a helix angle large enough to ensure that the movement in translation is converted into movement in rotation with a slightly positive efficiency;
   a housing for connection to said fixed part; said screw being movable in translation relative to said housing and provided for connection to said movable part, and extending through the nut which is located in said housing and fixed in translation and guided in rotation by said housing;
   means for locking the nut relative to said housing;
   said means for locking the nut comprising a set of teeth on the nut, a locking member, which is axially movably mounted in the housing coaxially around said screw and which is provided with a set of teeth which is complementary to said set of teeth on the nut for the purpose of locking the nut against rotation;
   an elastically yieldable element inside the housing associated with said locking member for constantly biasing it to its locking position;
   and means for retracting the locking member from the nut.

2. A device according to claim 1, wherein said means for retracting the locking member comprise a manual lever mounted to be pivotable about an axis perpendicular to the screw and provided with ears, pins cooperative with said ears and carried by the locking member, openings in the housing, said pins extending laterally out of the housing through said openings in the housing, whereby a pivoting of the lever results, by the action of said pins, in an axial retraction of the locking member relative to the nut and an unlocking of the nut.

3. A device according to claim 1, wherein the teeth of the set of teeth on the locking member and the teeth of the set of teeth on the nut have complementary pointed end portions and flat surfaces laterally extending said pointed end portions to prevent a natural disengagement of said sets of teeth.

4. A unit comprising a woodworking machine having a table, a guide carried by said table and a rapid adjusting linear device comprising at least one pair of elements consisting of a nut and a screw which are screw threadedly interengaged and cooperative; said nut and screw having screw threads which have a helix angle large enough to ensure that a movement in translation is converted into a movement in rotation with a slightly positive efficiency, and means for locking a rotary element of said pair of elements against rotation;
   said means for locking comprising a set of teeth on the nut, a locking member, which is axially movably mounted in the housing coaxially around said screw and which is provided with a set of teeth which is complementary to said set of teeth on the nut for the purpose of locking the nut against rotation;
   an elastically yieldable element inside the housing associated with said locking member for constantly biasing it to its locking position;
   means for retracting the locking member from the nut; and
   one element of said pair of elements being articulated by a first link to said table and the other element of said pair of elements being articulated by a second link to said guide for adjusting the position of said guide relative to said table, said first and second links being pivotable about a pivot for each link to thereby shift said guide in a parallel relation to said table to vary the dimension between the guide and a woodworking tool.

5. A unit comprising in combination:
   a stool having a foot, a seat movably mounted on said foot and a rapid adjusting linear device comprising at least one pair of elements consisting of a nut and a screw which are screw threadedly interengaged and cooperative, said nut and screw having screw threads which have a helix angle large enough to ensure that a movement in translation is converted into a movement in rotation with slightly positive efficiency; a housing for connection to said foot; said screw being movable in translation relative to said housing and connecting to said seat, said screw extending through said nut which is located in said housing and fixed in translation and guided in rotation by said housing;
   means for locking a rotary element of said pair of elements against rotation;
   said means for locking comprising a set of teeth on the nut, a locking member, which is axially movably mounted in the housing coaxially around said screw and which is provided with a set of teeth which is complementary to said set of teeth on the nut for the purpose of locking the nut against rotation;
   an elastically yieldable element inside the housing associated with said locking member for constantly biasing it to its locking position;
   means for retracting the locking member from the nut; and
   one element of said pair of elements being articulated to said seat and the other element of said pair of elements being articulated to said foot for adjusting the height of said seat relative to said foot.

6. A unit comprising in combination:

a seat structure comprising a seat frame and a backrest frame articulated to said seat frame;

said backrest frame pivotally mounted on said seat frame;

a rapid adjusting linear device comprising at least one pair of elements consisting of a nut and a screw which are screw threadedly engaged; said nut and screw having screw threads which have a helix angle large enough to insure that the movement in translation is converted into movement with rotation with a slightly positive efficiency;

a housing for connection with said seat frame for adjusting the inclination of said seat frame to the backrest frame;

said screw being movable in translation relative to said housing and provided for connection to said seat frame and extending through said nut located in said housing which is fixed in translation and guided in rotation by said housing;

means locking said nut relative to said housing which comprises a set of teeth on the nut;

a locking member which is axially movable in the housing coaxially with said screw and which is provided a set of teeth complementary to said set of teeth in said nut for locking said nut against rotation;

an elastically yieldable element inside the housing associated with said locking means to constantly bias said locking means to its locking position;

means for retracting the locking member from the nut;

fixed slideways and slides in said slideways connected to the seat frame by two links which are articulated to said seat frame; said movable slides adapted for adjusting the longitudinal position of said seat frame to a floor; and said housings being articulated to said seat frame for pivotal movement about an axis perpendicular to said screw.

* * * * *